US012200830B2

(12) United States Patent
Ito et al.

(10) Patent No.: US 12,200,830 B2
(45) Date of Patent: Jan. 14, 2025

(54) HEAT RADIANT HEATER

(71) Applicant: LINTEC Corporation, Tokyo (JP)

(72) Inventors: Masaharu Ito, Tokyo (JP); Takashi Morioka, Tokyo (JP)

(73) Assignee: LINTEC CORPORATION, Tokyo (JP)

( * ) Notice: Subject to any disclaimer, the term of this patent is extended or adjusted under 35 U.S.C. 154(b) by 3 days.

(21) Appl. No.: 17/622,056

(22) PCT Filed: Jun. 29, 2020

(86) PCT No.: PCT/JP2020/025550
§ 371 (c)(1),
(2) Date: Dec. 22, 2021

(87) PCT Pub. No.: WO2021/002331
PCT Pub. Date: Jan. 7, 2021

(65) Prior Publication Data

US 2022/0322496 A1 Oct. 6, 2022

(30) Foreign Application Priority Data

Jul. 4, 2019 (JP) ................................ 2019-125119

(51) Int. Cl.
*H05B 3/26* (2006.01)

(52) U.S. Cl.
CPC ....... *H05B 3/267* (2013.01); *H05B 2203/032* (2013.01)

(58) Field of Classification Search
CPC ... H05B 3/03; H05B 3/50; H05B 3/06; H05B 3/146; H05B 3/0023; H05B 3/34;
(Continued)

(56) References Cited

U.S. PATENT DOCUMENTS

2012/0061365 A1* 3/2012 Okamoto ............ B60H 1/2226 219/202
2015/0028119 A1* 1/2015 Satzger ............... B60H 1/2218 237/28

(Continued)

FOREIGN PATENT DOCUMENTS

DE 764267 C 8/1951
EP 2156971 A1 2/2010

(Continued)

OTHER PUBLICATIONS

English translation of International Preliminary Report on Patentability issued in corresponding International Patent Application No. PCT/JP2020/025550, dated Dec. 28, 2021.

(Continued)

*Primary Examiner* — Eric S Stapleton

(74) *Attorney, Agent, or Firm* — Rimon P.C.

(57) ABSTRACT

A thermal radiation heater includes: a heater element layer including a planar conductive body; at least one front surface side layer including an outermost layer and provided close to a front surface of the heater element layer; and at least one back surface side layer including an outermost layer and provided close to a back surface of the heater element layer. The outermost layer close to the front surface has an emissivity of 0.7 or more, and the outermost layer close to the back surface has an emissivity of 0.6 or less.

6 Claims, 4 Drawing Sheets

(58) Field of Classification Search
CPC ........ H05B 2203/007; H05B 2203/023; H05B 2203/011; H05B 3/267; H05B 2203/013; H05B 2203/032
USPC ........................................... 219/537; 392/435
See application file for complete search history.

(56) References Cited

U.S. PATENT DOCUMENTS

| | | | | |
|---|---|---|---|---|
| 2016/0167482 A1* | 6/2016 | Oh | ........................ | B60H 1/2225 219/202 |
| 2018/0257456 A1* | 9/2018 | Oh | ........................ | B60H 1/2215 |
| 2019/0021139 A1* | 1/2019 | Kondo | ................... | H05B 3/283 |

FOREIGN PATENT DOCUMENTS

| | | | | |
|---|---|---|---|---|
| JP | 3007412 U | 2/1995 | | |
| JP | 07-226288 A | 8/1995 | | |
| JP | 2003-097811 A | 4/2003 | | |
| JP | 2005-212556 A | 8/2005 | | |
| JP | 2016-113137 A | 6/2016 | | |
| JP | 2017-149198 A | 8/2017 | | |
| WO | 2012/043104 A1 | 4/2012 | | |
| WO | 2015/004852 A1 | 1/2015 | | |
| WO | 2016/017139 A1 | 2/2016 | | |
| WO | WO-2017163986 A1 * | 9/2017 | .............. | F26B 15/12 |

OTHER PUBLICATIONS

International Search Report issued in corresponding International Patent Application No. PCT/JP2020/025550, dated Aug. 11, 2020, with English translation.
Extended European Search Report issued in corresponding European Patent Application No. 20834668.4, dated Jun. 20, 2023.

* cited by examiner

HEAT RADIANT HEATER

CROSS REFERENCE TO RELATED APPLICATIONS

This application is the U.S. National Phase under 35 U.S.C. § 371 of International Application No. PCT/JP2020/025550, filed on Jun. 29, 2020, which claims the benefit of Japanese Patent Application No. 2019-125119, filed on Jul. 4, 2019, the entire contents of each are hereby incorporated by reference.

TECHNICAL FIELD

The present invention relates to a thermal radiation heater.

BACKGROUND ART

A thermal radiation heater has been proposed as a heating device for vehicles and the like. Occupants in the vehicle can be directly warmed by infrared rays radiated from such a thermal radiation heater into the vehicle.

For example, Patent Literature 1 describes a radiant heating device for a vehicle including: a planar electric heater disposed along a surface of an interior member in a vehicle interior; and a heat radiating member disposed on the surface of the electric heater and formed from a material with high thermal emissivity. In the radiant heating device for the vehicle, the heat radiating member is heated by heat generated by the electric heater and infrared rays are radiated from a surface of the heat radiating member.

Patent Literature 2 describes a radiant heater that is installed in a vehicle and generates heat to radiate radiation heat. The radiant heater includes a radiant section having a surface close to a steering wheel of the vehicle. Radiation heat is radiated from this surface to the outside of the radiant section. The radiant section is spaced apart from the steering wheel such that the steering wheel is positioned normal to that surface.

CITATION LIST

Patent Literature(s)

Patent Literature 1: JP2005-212556 A
Patent Literature 2: JP2017-149198 A

SUMMARY OF THE INVENTION

Problem(s) to be Solved by the Invention

An object of the invention is to provide a thermal radiation heater with improved heating efficiency.

Means for Solving the Problem(s)

A thermal radiation heater according to an aspect of the invention includes: a heater element layer including a planar conductive body; at least one front surface side layer including an outermost layer and provided close to a front surface of the heater element layer; and at least one back surface side layer including an outermost layer and provided close to a back surface of the heater dement layer, in which the outermost layer close to the front surface has an emissivity of 0.7 or more, and the outermost layer close to the back surface has an emissivity of 0.6 or less.

In the thermal radiation heater according to the above aspect of the invention, the planar conductive body is preferably at least one selected from the group consisting of a pseudo sheet structure in which a plurality of conductive linear bodies are arranged at intervals, metallic foil, a conductive particle dispersed film, a conductive nanowire dispersed film, and a metal mesh.

In the thermal radiation heater according to the above aspect of the invention, a material of the outermost layer close to the back surface is preferably at least one selected from the group consisting of a metal, a metal compound, a coating film of a thermal barrier coating material, and a coating film of a metallic particle-containing coating material.

In the thermal radiation heater according to the above aspect of the invention, the heater element layer preferably has a thickness of 0.3 mm or less.

The thermal radiation heater according to the above aspect of the invention preferably has a thickness of 1 mm or less.

The thermal radiation heater according to the above aspect of the invention preferably has a freestanding property.

It is preferable that the thermal radiation heater according to the above aspect of the invention further includes a support member and a spacer, in which the outermost layer close to the back surface in the thermal radiation heater is supported by the support member through the spacer.

In the thermal radiation heater according to the above aspect of the invention, the support member is preferably a conductive member.

In the thermal radiation heater according to the above aspect of the invention, the spacer is preferably a mesh spacer.

According to the invention, it is possible to provide a thermal radiation heater with improved heating efficiency.

DESCRIPTION OF EMBODIMENT(S)

First Exemplary Embodiment

Figure 1:
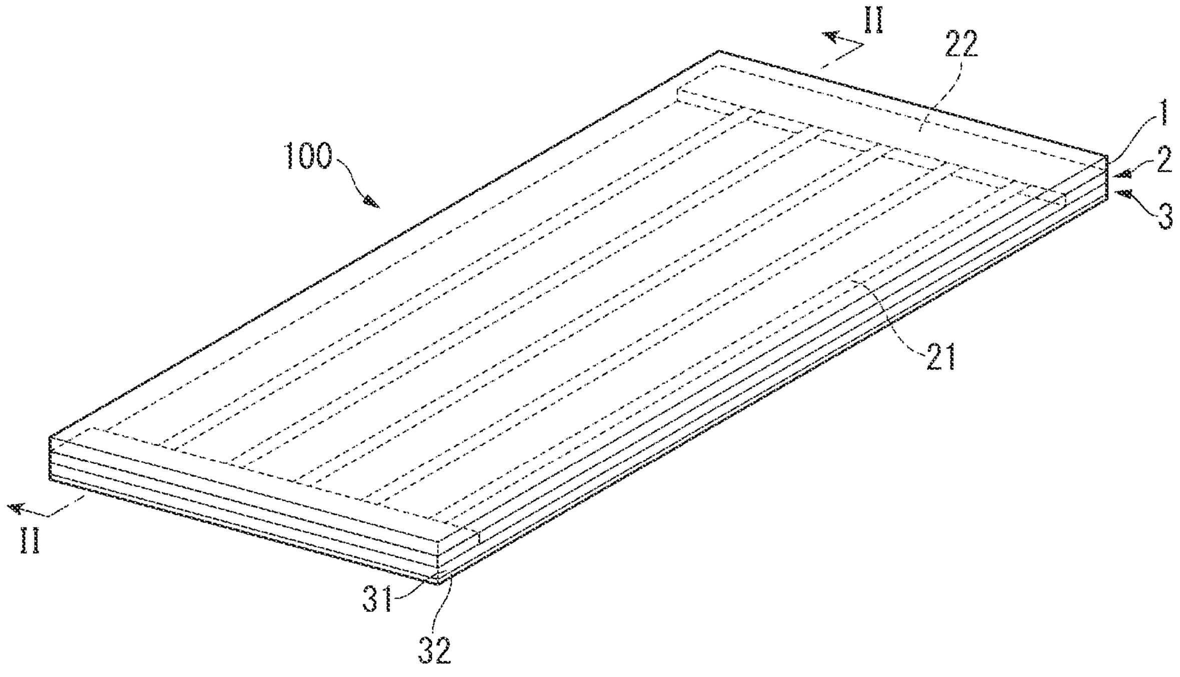
FIG. 1 schematically shows a thermal radiation heater according to a first exemplary embodiment of the invention.

Referring to the drawings, the invention is explained below with an exemplary embodiment cited as an example. The scope of the invention is not limited to the contents of the exemplary embodiment. It should be noted that some parts are shown on an enlarged scale or a reduced scale in the drawings for the convenience of explanation.

Figure 2:
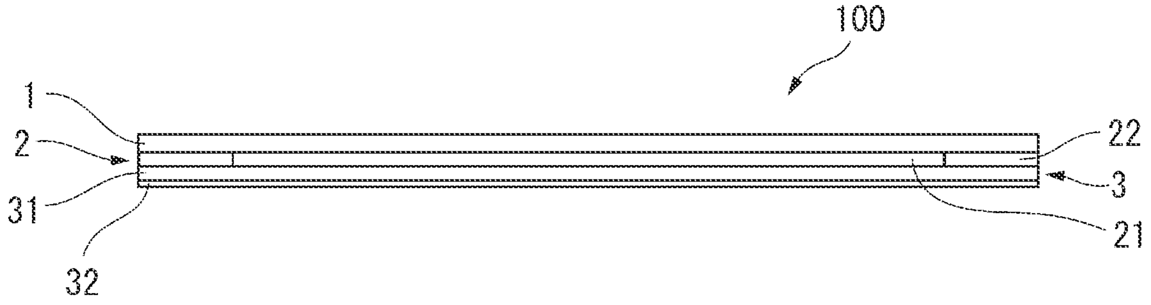
FIG. 2 is a cross-sectional view of a cross section in FIG. 1.

As shown in FIGS. 1 and 2, a thermal radiation heater 100 according to the first exemplary embodiment includes: a heater element layer 2 having a planar conductive body; at least one front surface side layer 1 close to a front surface of the heater element layer 2; and at least one back surface side layer 3 close to a back surface of the heater element layer 2. In the first exemplary embodiment shown in FIGS. 1 and 2, the heater element layer 2 is a pseudo sheet structure in which a plurality of conductive linear bodies 21 are arranged at intervals.

The front surface side layer 1 may be a single layer or two or more layers. The back surface side layer 3 may be a single layer or two or more layers.

In the first exemplary embodiment, the front surface side layer 1 is a single layer. The front surface side layer 1 is an outermost layer close to the front surface of the heater element layer 2. The back surface side layer 3 includes a first back surface side layer 31 and a second back surface side layer 32. The second back surface side layer 32 is an outermost layer close to the back surface of the heater element layer 2.

In the first exemplary embodiment, the outermost layer close to the front surface is required to have an emissivity of 0.7 or more. At an emissivity of 0.7 or more, heat can be sufficiently radiated from the front surface side layer 1 to a heated part. From the same viewpoint, the emissivity is preferably 0.8 or more, and more preferably 0.9 or more.

In the first exemplary embodiment, the outermost layer close to the back surface is required to have an emissivity of 0.6 or less. At an emissivity of 0.6 or less, it is quite possible to reduce thermal radiation from the back surface side layer 3 and to amplify thermal radiation from the front surface side layer 1. From the same viewpoint, the emissivity is preferably 0.5 or less, more preferably 0.4 or less, and further preferably 0.1 or less.

The emissivities of the outermost layers close to the front and back surfaces are values measured by an emissivity meter at a measurement wavelength of 2 μm to 22 μm.

The reason why heating efficiency can be improved by the thermal radiation heater 100 according to the first exemplary embodiment is presumed by the inventors, as follows.

The amount of energy radiated from a surface of an object depends on the emissivity of the surface of the object, and higher emissivity results in more heat transferred by thermal radiation. Thus, under application of comparable energy (comparable output), the amount of energy stored as heat in the thermal radiation heater 100 is larger, as the amount of energy of thermal radiation from the outermost layer close to the back surface is smaller. The amount of energy of thermal radiation from the outermost layer close to the front surface increases as the amount of energy in the thermal radiation heater 100 increases. Thermal radiation from the outermost layer close to the front surface can thus be amplified. Therefore, the thermal radiation heater 100 can have improved heating efficiency by forming the outermost layer close to the front surface from a substance with high emissivity and forming the outermost layer close to the back surface from a substance with small emissivity.

Front Surface Side Layer

The front surface side layer 1 is provided close to the front surface of the heater element layer 2. In the first exemplary embodiment, the front surface side layer 1, which is the outermost layer close to the front surface, radiates infrared rays. When the front surface side layer 1 is a single layer as described above, the front surface side layer 1 preferably functions also as an insulating layer to inhibit a short circuit, electric shock, or the like of the heater element layer 2.

Examples of material of the front surface side layer 1 include paper such as heat-resistance paper, woven fabric, non-woven fabric, synthetic leather, natural leather, ceramics, thermoplastic resin, and a cured product of curable resin. The front surface side layer 1 may have a brushed surface. The thermoplastic resin and the cured product of curable resin are preferably used in terms of versatility or imparting flexibility to the thermal radiation heater 100.

The thermoplastic resin and the cured product of curable resin are exemplified, for example, by rubber resin, silicone resin, polyester resin, polycarbonate resin, polyimide resin, polyolefin resin, polyurethane resin, and acrylic resin and cured products thereof. Among the above, silicone resin, polyester resin, polycarbonate resin, polyimide resin, and the like and cured products thereof are preferable in terms of high heat resistance.

The front surface side layer 1 may be two or more layers. For example, the front surface side layer 1 may have an intermediate layer close to the front surface in contact with the heater element layer 2 (not shown) and an outermost layer close to the front surface (not shown). In this case, the intermediate layer close to the front surface is preferably an insulating layer.

In such a case, the same material as that of the front surface side layer 1 or a material having an emissivity of less than 0.7 may be used as the material of the intermediate layer close to the front surface.

The same material as that of the front surface side layer 1, a coloring material having an emissivity of 0.7 or more, or the like may be used as the material of the outermost layer close to the front surface. The coloring material provides a design to the surface of the thermal radiation heater 100. When a black spray is used as the coloring material, the emissivity of the outermost layer close to the front surface can be increased to approximately 0.94.

Back Surface Side Layer

The back surface side layer 3 is provided close to the back surface of the heater element layer 2. In the first exemplary embodiment, the back surface side layer 3 has a first back surface side layer 31 and a second back surface side layer 32.

The first back surface side layer 31 is an insulating layer for inhibiting a short circuit of the heater element layer 2 or the like. Examples of material of the first back surface side layer 31 are the same as those of material of the front surface side layer 1.

The second back surface side layer 32 is the outermost layer close to the back surface. The outermost layer close to the back surface reduces thermal radiation from the back surface side layer 3.

Examples of material of the second back surface side layer 32 include a metal, a metal compound, and a coating film of a thermal barrier coating material. Examples of the metal include metals such as copper, aluminum, tungsten, iron, molybdenum, nickel, titanium, silver, gold, palladium, and tin, or alloys containing two or more types of metals (e.g., steels such as stainless steel and carbon steel, brass, phosphor bronze, zirconium-copper alloy, beryllium copper, iron nickel, Nichrome (registered trademark), nickel titanium, kANTHAL (registered trademark), HASTELLOY (registered trademark), constantan, cupronickel, and rhenium tungsten). Examples of the metal compound include ITO, GZO, and metal oxides of the above metals. The thermal barrier coating material may be a known thermal barrier coating material. Among the above, a metal is preferably used in terms of low emissivity, and a metal that is not likely to oxidize is more preferably used to avoid the increase in thermal emissivity due to oxidation.

A surface of the second back surface side layer 32 is preferably highly smooth in terms of reducing the emissivity of the outermost layer close to the back surface.

When the thermal radiation heater 100 according to the first exemplary embodiment of the invention is used in a thermal radiation heater 100A according to a second exemplary embodiment of the invention described below, the outermost layer close to the back surface (second back surface side layer 32) is preferably formed from a conductive material such as a metal.

The thickness of the second back surface side layer 32 is preferably 30 nm or more, and more preferably 3 μm or more in terms of durability.

The back surface side layer 3 may be three or more layers. For example, the back surface side layer 3 may further include a heat insulator layer (not shown) between the first back surface side layer 31 and the second back surface side layer 32.

In such a case, the heat insulator layer is preferably formed from a foam heat insulator or fibrous heat insulator. The foam heat insulator is more preferable. The foam heat insulator is preferably a resin foam. Examples of the resin foam include styrene foam, urethane foam, polypropylene foam, polyethylene foam, phenol foam, and foamed synthetic rubber elastomer. The fibrous heat insulator is preferably an inorganic fibrous heat insulator. Examples of the inorganic fibrous heat insulator include glass wool and rock wool.

Heater Element Layer

The heater element layer 2 includes a planar conductive body.

Examples of the planar conductive body include a pseudo sheet structure in which a plurality of conductive linear bodies are arranged at intervals, metallic foil, a conductive particle dispersed film, a conductive nanowire dispersed film, and a metal mesh.

The planar conductive body in the first exemplary embodiment is a pseudo sheet structure. The heater element layer 2 includes the conductive linear bodies 21 and electrodes 22.

Examples of the conductive linear bodies 21 include linear bodies including carbon nanotubes, metal wires, and composite linear bodies thereof. Examples of the metal wires include wires containing metals such as copper, aluminum, tungsten, iron, molybdenum, nickel, titanium, silver, and gold, or alloys containing two or more types of metals (e.g., steels such as stainless steel and carbon steel, brass, phosphor bronze, zirconium-copper ahoy, beryllium copper, iron nickel, Nichrome (registered trademark), nickel titanium, KANTHAL (registered trademark), HASTELLOY (registered trademark), rhenium tungsten, and cupronickel). The metal wires may be plated. The surface of the metal wires may be coated with a polymer.

The diameter of the conductive linear bodies 21 is preferably 0.3 mm or less, more preferably in a range from 0.005 mm to 0.2 mm, and particularly preferably in a range from 0.01 mm to 0.1 mm.

The electrodes 22 may be formed from a known electrode material.

Examples of the metallic foil include aluminum foil, stainless steel foil, copper foil, tin foil, silver foil, and nickel foil.

The conductive particles in the conductive particle dispersed film are exemplified, for example, by ITO particles, GZO particles, and metal particles (e.g., silver particles and copper particles).

Examples of the metal mesh include a silver mesh, copper mesh, and stainless steel mesh.

The thickness of the heater element layer 2 is preferably 0.3 mm or less. At a thickness of 0.3 mm or less, it is easy to impart predetermined electrical resistance characteristics to the planar conductive body, improving heating efficiency. The thickness of the heater element layer 2 is more preferably in a range from 0.005 mm to 0.2 mm, and particularly preferably in a range from 0.01 mm to 0.1 mm. When the heater element layer 2 is a pseudo sheet structure in which a plurality of conductive linear bodies are arranged at intervals, the thickness of the heater element layer 2 is a diameter of the conductive linear bodies 21.

Thermal Radiation Heater

The thickness of the thermal radiation heater 100 is preferably 1 mm or less. At a thickness of 1 mm or less, the thermal capacity of the thermal radiation heater 100 is small, making it possible to avoid problems caused by heat such as a skin burn. The thickness of the thermal radiation heater 100 is more preferably in a range from 0.02 mm to 0.8 mm, and further preferably in a range from 0.05 mm to 0.6 mm. When the thickness of the thermal radiation heater 100 falls within each of the above ranges, the strength of the thermal radiation heater 100 is likely to be maintained. When the thickness of the heater element layer 2 is 0.1 mm or less, the thermal radiation heater 100 with a smaller thickness is obtained easily. In this case, the thickness of the thermal radiation heater 100 is preferably in a range from 0.02 mm to 0.2 mm, and more preferably in a range from 0.05 mm to 0.1 mm.

Figure 3:
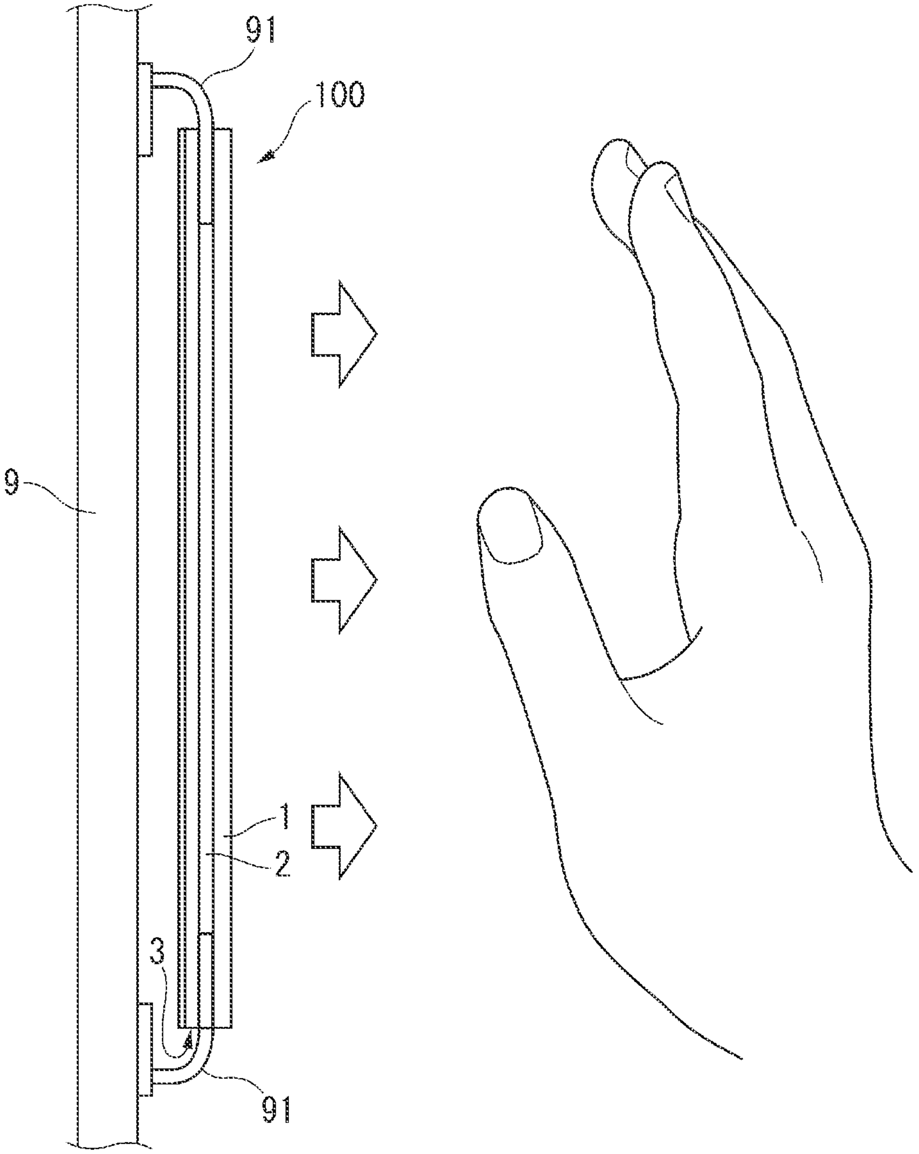
FIG. 3 illustrates how to use the thermal radiation heater according to the first exemplary embodiment of the invention.
Figure 4:
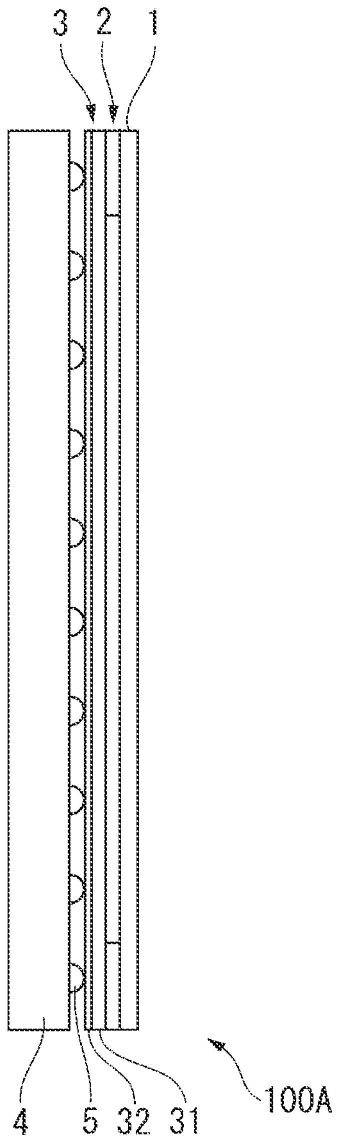
FIG. 4 schematically shows a thermal radiation heater according to a second exemplary embodiment of the invention.

The thermal radiation heater 100 is preferably used in a manner as shown in FIG. 3. That is, the front surface side layer 1 exhibiting the heating function is not in contact with any other member based on the principle of warming an object by thermal radiation, and it is preferable that the back surface side layer 3 is also not in contact with any other member. In the first exemplary embodiment, the thermal radiation heater 100 is attached to an attachment target member 9 by connecting an electrode member 91 to the electrodes 22, Examples of the attachment target member 9 include a vehicle interior, a support plate for a heating appliance, and a support plate for an industrial heating device. The electrode member 91 may be formed from a known electrode material. Arrows in FIG. 3 indicate a thermal radiation direction.

When the back surface side layer 3 is in contact with any other member, the heating efficiency tends to decrease. This is because the heat generated from the heater element layer 2 is taken away by the member in contact with the back surface side layer 3 due to thermal conduction. Further, heating a member in contact with the back surface side layer 3 by thermal conduction may exert an adverse effect on the member. Thus, the thermal radiation heater 100 preferably has a freestanding property, specifically, at least part of the thermal radiation heater 100 is preferably in a freestanding state when used. Further, the thermal radiation heater 100 preferably has flexibility to adapt to the type and shape of the attachment target member 9.

Operation and Effect of First Exemplary Embodiment

The first exemplary embodiment can achieve the following operation and effect.

(1) In the first exemplary embodiment, the amount of energy of thermal radiation from the outermost layer close to the back surface is small and the amount of energy of thermal radiation from the outermost layer close to the front surface is large. This amplifies the thermal radiation from the outermost surface close to the front surface (see, arrows in FIG. 3).

Second Exemplary Embodiment

Referring to the drawings, the second exemplary embodiment of the invention is explained below. The second exemplary embodiment of the invention is not limited to the contents of the exemplary embodiment. It should be noted that some parts are shown on an enlarged scale or a reduced scale in the drawings for the convenience of explanation.

The second exemplar embodiment is different from the first exemplary embodiment in that a support member 4, which is not used in the first exemplary embodiment, is further provided in the second exemplary embodiment.

In the following, parts different from the first exemplary embodiment are mainly described and duplicate explanations are omitted or simplified. Components that are the same as those of the first exemplary embodiment are designated by the same codes, and any explanation therefor is omitted or simplified.

As shown in Hg. 4, a thermal radiation heater 100A according to the second exemplary embodiment further includes the support member 4 and spacers 5. The thermal radiation heater 100A is supported by the support member 4 with the outermost layer close to the back surface (second back surface side layer 32) and the dot-shaped spacers 5 interposed between the front surface side layer 1 and the support member 4.

The support member 4 is preferably a conductive member. The conductive member preferably has a planar shape similar to the thermal radiation heater 100A. In such a case, the material of the second back surface side layer 32 preferably has a conductive property. Examples of material of the second back surface side layer 32 having the conductive property include a metal and a metal compound.

As the conductive member, it is possible to use, for example, a planar member with a known conductive film.

The spacer(s) 5 may have any shape provided that the spacer(s) 5 can exhibit the operation and effect described below. The spacer(s) 5 may be dot-shaped, line-shaped, lattice-shaped, or the like, and are preferably dot-shaped. In order that the second back surface side layer 32 and the conductive member can contact with each other during pressing, the longest length between two points on a contour of the dot-shaped spacer 5 in top view is preferably 5 mm or less, more preferably in a range from 0.1 mm to 3 mm. The spacers 5 are preferably formed from a material having low thermal conductivity. When the support member 4 is a conductive member, the spacers 5 are preferably formed from an insulating material.

Operation and Effect of Second Exemplary Embodiment

The second exemplary embodiment can achieve the operation and effect similar to the above (1) in the first exemplary embodiment as well as the operation and effect (2) described below.

(2) When a sheet part (a sheet-shaped part including the front surface side layer 1, the heater element layer 2, and the back surface side layer 3) of the thermal radiation heater 100A is supported by the support member 4 through the spacers 5, the sheet part of the thermal radiation heater 100A even with flexibility is not likely to bend at its center portion, and is not likely to move due to wind or vibration. Further, the thermal radiation heater 100A is fixed to the support member 4 through the spacers 5 without any contact between the second back surface side layer 32 of the thermal radiation heater 100A and the support member 4. Furthermore, when he/she touches the thermal radiation heater 100A with his/her finger(s), the heater 100A is pressed to bring a part of the second back surface side layer 32 into contact with a part of the support member 4. The support member 4 formed from a conductive member can detect the contact of the finger or the like. Upon the detection of the contact of a finger or the like, the application of energy to the thermal radiation heater 100A may be disconnected. This configuration inhibits problems due to heat such as a burn and fire.

Modifications

The invention is not limited to the above exemplary embodiments. Modifications, improvements, etc. compatible with the object of the invention are within the scope of the invention.

For example, in the first exemplary embodiment, the thermal radiation heater 100 is attached to the attachment target member 9 by connecting the electrode member 91 to the electrodes 22. The invention is not limited thereto. For example, the thermal radiation heater 100 may be attached to the attachment target member 9 through a fixing member provided at an end of the heater 100 with a space between the attachment target member 9 and the heater 100. Alternatively, the thermal radiation heater 100 may be attached to the attachment target member 9 through a fixing member provided at a center portion of the heater 100 with a space between the attachment target member 9 and the heater 100.

In the second exemplary embodiment, the thermal radiation heater 100A is fixed to the support member 4 through the dot-shaped spacers 5. The invention is not limited thereto. For example, a mesh spacer may be used as the spacer 5. In this case, the thermal radiation heater 100A is fixed to the support member 4 through the mesh spacer such that the second back surface side layer 32 of the heater 100A has no contact with the support member 4 in a meshed part (opening) of the mesh spacer and the second back surface side layer 32 of the heater 100A is in contact with the support member 4 in a line part surrounding the meshed part. The mesh spacer supports in every direction an area of the thermal radiation heater 100A surrounded by the line part of the mesh spacer. The thermal radiation heater 100A thus has improved resistance to thermal expansion. The mesh spacer used as the spacer 5 is also formed from a material with low thermal conductivity, preferably an insulating material, which is exemplified by glass fiber and the like. The mesh preferably has a pitch (inside dimension) in a range from 1 mm to 15 mm, the line part of the mesh preferably has a width in a range from 100 μm to 1000 μm, and the mesh preferably has a thickness in a range from 50 μm to 800 μm.

EXAMPLES

The invention is more specifically described below with reference to Examples. The scope of the invention is by no means limited to Examples,

Example 1

A 25-μm-thick polyimide film ("Kapton 100H" (registered trademark) produced by DUPONT-TORAY CO., LTD.) was used as a base close to the front surface, and provided with a 10-μm-thick acrylic adhesive agent layer thereon to prepare an adhesive sheet.

A tungsten wire (14 μm in diameter, produced by TOKUSAI Tungl oly Co., LTD., product name: TWG-CS) was prepared as conductive linear bodies.

Next, the prepared adhesive sheet was creaselessly wound on a drum member having a rubber outer circumferential surface with a surface of the adhesive agent layer facing outward, and subsequently, both ends of the adhesive sheet in the circumferential direction of the drum member were fixed by a double-sided tape. A bobbin around which the wire was wound was prepared and attached on the surface of the adhesive agent layer of the adhesive sheet located near an end of the drum member. The wire was fed from the bobbin and simultaneously wound on the drum member. The drum member was gradually moved in a direction parallel to a drum axis of the drum member, so that the wire was wound on the drum member at equal intervals in a linear form. Accordingly, a plurality of wires were provided on the surface of the adhesive agent layer of the adhesive sheet so that adjacent ones of the plurality of the wires were spaced from each other at a predetermined distance, thereby forming a pseudo sheet structure including wires.

The adhesive sheet was cut in parallel with the drum axis together with the pseudo sheet structure to obtain a conductive sheet. In the obtained conductive sheet, the interval between the tungsten wires in the pseudo sheet structure was 2.5 mm.

Next, a 25-μm-thick polyimide film ("Kapton 100H" (registered trademark) produced by DUPONT-TORAY CO., LTD.) was prepared as a base close to the back surface. Aluminum vapor deposition with a thickness of 80 nm was applied to one surface of this polyimide film. After the aluminum vapor deposition, two copper tapes were attached as electrodes to the other surface of the polyimide film not subjected to the aluminum vapor deposition, obtaining a film with electrodes. The positions of the two copper tapes were adjusted so that the two copper tapes were in contact with both ends of the pseudo-sheet structure in the obtained conductive sheet (a closest distance between the electrodes: 100 mm).

The obtained conductive sheet and the obtained film with electrodes were laminated so that the pseudo sheet structure was in contact with the copper tapes, thus obtaining a thermal radiation heater.

Example 2

A thermal radiation heater was obtained in the same manner as in Example 1 except that aluminum vapor deposition applied to the base close to the back surface was changed to nickel vapor deposition.

Then, an 85-μm-thick dust-free paper (produced by Lintec Corporation) was adhered to the front surface of this thermal radiation heater (exposed surface of the base close to the front surface) with a 10-μm-thick acrylic adhesive agent to obtain a thermal radiation heater of Example 2.

Example 3

In place of the pseudo sheet structure with tungsten wires used in Example 1, a pseudo sheet structure in Example 3 was obtained by providing, on the adhesive sheet used in Example 1, a single nickel wire (nickel wire produced by TOKUSAI TungMoly Co., LTD., 250 μm in diameter) in a form of a crank. Specifically, the nick& wire on the adhesive agent layer of the adhesive sheet was stretched from a first end of the adhesive sheet, folded back in the vicinity of a second end of the adhesive sheet in front of an area where an electrode is to be formed, again stretched toward the first end, and folded back in front of an area where an electrode is to be formed. The single nick& wire was made to have a crank form with a plurality of bent portions by repeating the above steps. The end point of the nickel wire was positioned at the second end of the adhesive sheet. The start and end points of the crank-shaped nickel wire were connected to the electrodes at both ends of the thermal radiation heater. The pseudo sheet structure in Example 3 was the same in resistance value as the pseudo sheet structure in Example 1, which was 2.4Ω. A thermal radiation heater was obtained in the same manner as in Example 1 except that the nickel wire in a form of a crank was used in the pseudo sheet structure and aluminum vapor deposition was not applied to the base close to the back surface.

Then, a 12-μm-thick aluminum foil was adhered to the back surface of this thermal radiation heater (exposed surface of the base close to the back surface) with a 10-μm-thick acrylic adhesive agent, and the front surface (exposed surface of the base close to the front surface) of this thermal radiation heater was coated with a black spray ("TA410KS" produced by NICHINEN) to have a thickness of 20 μm and dried. Accordingly, a thermal radiation heater in Example 3 was obtained.

Example 4

A thermal radiation heater was obtained in the same manner as in Example 1 except that: a 100-μm-thick polyethylene terephthalate film ("A4100" produced by TOYOBO CO., LTD.) was used, in place of the polyimide film, as a base close to each of the front surface and the back surface; and GZO (gallium-doped zinc oxide) sputtering was applied in place of the aluminum vapor deposition applied to the base close to the back surface.

Comparative 1

A thermal radiation heater was obtained in the same manner as in Example 1 except that aluminum vapor deposition was not applied to the base close to the back surface.

Thickness of Thermal Radiation Heater

The thickness of each thermal radiation heater was measured by a film thickness gauge ("PG-02" produced by Teclock). Table 1 shows the obtained results.

Emissivity

Each thermal radiation heater was used as a test piece. The emissivities at the front and back surface sides of the test piece were measured by an emissivity meter (TSS-5X-2 produced by JAPANSENSOR Corporation) at a measurement wavelength of 2 μm to 22 μm. Table 1 shows the obtained results.

Temperature Rise Test

Each thermal radiation heater was placed in midair with no contact, and driven under an output condition of 0.2 W/cm$^2$. After operating for one minute, a center temperature of the operating thermal radiation heater was measured using a thin film thermocouple ("GMT-TC-SB7.5 (P)" produced by GEOMATEC Co., Ltd.). Table 1 shows the obtained results.

TABLE 1

| | Thickness (mm) of Thermal Radiation Heater | Heater Element Layer | | Outermost Layer close to Front Surface | | Outermost Layer close to Back Surface | | Measured Temparature (° C.) in Temparature Rise Test |
|---|---|---|---|---|---|---|---|---|
| | | Material | Thickness (μm) | Material | Emissivity | Material | Emissivity | |
| Example 1 | 0.084 | tungsten | 14 | polyimide | 0.88 | aluminum vapor deposition | 0.02 | 105 |
| Example 2 | 0.179 | tungsten | 14 | paper | 0.91 | nickel vapor deposition | 0.03 | 98 |

TABLE 1-continued

| | Thickness (mm) of Thermal Radiation Heater | Heater Element Layer | | Outermost Layer close to Front Surface | | Outermost Layer close to Back Surface | | Measured Temparature (° C.) in Temparature Rise Test |
|---|---|---|---|---|---|---|---|---|
| | | Material | Thickness (μm) | Material | Emissivity | Material | Emissivity | |
| Example 3 | 0.362 | nickel | 250 | black spray | 0.93 | aluminum foil | 0.02 | 100 |
| Example 4 | 0.234 | tungsten | 14 | polyethylene terephthalate | 0.91 | GZO | 0.50 | 89 |
| Comparative 1 | 0.084 | tungsten | 14 | polyimide | 0.88 | polyimide | 0.88 | 78 |

As is clear from the results shown in Table 1, when the emissivity of the outermost layer close to the front surface was 0.7 or more and the emissivity of the outermost layer close to the back surface was 0.6 or less (Examples 1 to 4), the center temperature of the thermal radiation heater was higher than that of a case not satisfying the above conditions (Comparative 1).

That is, the amount of energy of thermal radiation increases as the center temperature of the thermal radiation heater increases. Thus, the amount of energy of thermal radiation from the outermost layer close to the front surface in Examples 1 to 4 can be amplified larger than Comparative 1.

Further, the reason why the center temperature of the thermal radiation heater was low in Comparative 1 is assumed that the amount of the energy of thermal radiation from the outermost layer close to the front surface decreased in inverse proportion to the amount of the energy of thermal radiation from the outermost layer close to the back surface.

Example 5

A glass fiber mesh with adhesive (“Adhesive-type Putty Net Tape” produced by Asahipen Corporation, pitch: about 3 mm) was prepared as a mesh material for a spacer, and a glass plate was prepared as a support member of a thermal radiation heater. The thermal radiation heater obtained in Example 1 was adhered to an adhesive surface of the mesh material such that the surface of the base close to the back surface subjected to aluminum vapor deposition faced the adhesive surface. Accordingly, a thermal radiation heater with a mesh spacer was obtained. The thermal radiation heater with the spacer was installed on the glass plate with a side provided with the mesh material facing the glass plate. The installation was performed by fixing two of four sides of the thermal radiation heater provided with no electrode to the glass plate using an aluminum tape.

The temperature rise test described above was conducted on the obtained thermal radiation heater, and the measured temperature was 93 degrees C. It is found out from this result that the center temperature of the thermal radiation heater can be raised higher than Comparative 1 also when the thermal radiation heater provided with the spacer close to the back surface is supported by the support member.

The invention claimed is:

1. A thermal radiation heater comprising:

a heater element layer comprising a planar conductive body;

at least one front surface side layer comprising an outermost layer and provided close to a front surface of the heater element layer;

at least one back surface side layer comprising an outermost layer and provided close to a back surface of the heater element layer;

a spacer; and a support member that is a conductive member, wherein the support member supports the outermost layer close to the back surface in the thermal radiation heater through the spacer, wherein:

the outermost layer close to the front surface has an emissivity of 0.7 or more, the outermost layer close to the back surface has an emissivity of 0.6 or less, the outermost layer close to the back surface in the thermal radiation heater is supported by the support member through the spacer, the thermal radiation heater has a thickness of 1 mm or less, and the thermal radiation heater is configured such that when the thermal radiation heater is touched and pressed by a finger of a user, a part of the outermost layer close to the back surface is brought into contact with a part of the conductive member, and contact of the finger is detected by the conductive member, and when the contact of the finger is detected, application of energy to the thermal radiation heater is disconnected.

2. The thermal radiation heater according to claim 1, wherein the planar conductive body is at least one selected from the group consisting of a pseudo sheet structure in which a plurality of conductive linear bodies are arranged at intervals, metallic foil, a conductive particle dispersed film, a conductive nanowire dispersed film, and a metal mesh.

3. The thermal radiation heater according to claim 1, wherein a material of the outermost layer close to the back surface is at least one selected from the group consisting of a metal, a metal compound, a coating film of a thermal barrier coating material, and a coating film of a metallic particle-containing coating material.

4. The thermal radiation heater according to claim 1, wherein the heater element layer has a thickness of 0.3 mm or less.

5. The thermal radiation heater according to claim 1, wherein the thermal radiation heater has a freestanding property.

6. The thermal radiation heater according to claim 1, wherein the spacer is a mesh spacer.

* * * * *